United States Patent
Tahir

(10) Patent No.: US 12,172,152 B1
(45) Date of Patent: Dec. 24, 2024

(54) SYNTHESIS AND APPLICATION OF ZINC COBALT OXIDE/SULFIDE NANORODS FOR PHOTOCATALYTIC WATER SPLITTING AND CARBON DIOXIDE REDUCTION

(71) Applicant: United Arab Emirates University, Al Ain (AE)

(72) Inventor: Muhammad Tahir, Al Ain (AE)

(73) Assignee: UNITED ARAB EMIRATES UNIVERSITY, Al-Ain (AE)

(*) Notice: Subject to any disclaimer, the term of this patent is extended or adjusted under 35 U.S.C. 154(b) by 0 days.

(21) Appl. No.: 18/660,554

(22) Filed: May 10, 2024

(51) Int. Cl.
| | |
|---|---|
| *B01J 35/39* | (2024.01) |
| *B01J 23/00* | (2006.01) |
| *B01J 23/80* | (2006.01) |
| *B01J 27/043* | (2006.01) |
| *B01J 35/45* | (2024.01) |
| *B01J 35/50* | (2024.01) |

(Continued)

(52) U.S. Cl.
CPC ............. *B01J 35/39* (2024.01); *B01J 23/005* (2013.01); *B01J 23/80* (2013.01); *B01J 27/043* (2013.01);
(Continued)

(58) Field of Classification Search
CPC ... B01J 35/39; B01J 35/45; B01J 35/50; B01J 23/005; B01J 23/80; B01J 27/043;
(Continued)

(56) References Cited

FOREIGN PATENT DOCUMENTS

| CN | 107164838 A | * 9/2017 | ............. D01F 1/10 |
| CN | 109621981 A | * 4/2019 | ............ B01J 27/043 |

(Continued)

OTHER PUBLICATIONS

Depeng Zhao et al., "Bi-interface induced multi-active MCo2O4@MCo2S4@PPy (M=Ni, Zn) sandwich structure for energy storage and electrocatalysis." Nano Energy 57, pp. 363-370. (Year: 2019).*

(Continued)

*Primary Examiner* — Patricia L. Hailey

(74) *Attorney, Agent, or Firm* — MH2 Technology Law Group, LLP

(57) ABSTRACT

There is disclosed photoactive, one-dimensional zinc and cobalt-based bimetallic oxide and sulfide nanorods ($ZnCo_2O_4$ NRs, $ZnCo_2S_4$ NRs) and their heterojunction composites (1D/1D $ZnCo_2O_4/ZnCo_2S_4$) to be used as photocatalysts for hydrogen production and carbon dioxide reduction using solar energy. Also disclosed herein, is a method of synthesizing these compounds via hydrothermal processes and a self-assembly approach. 1D/1D heterojunctions of $ZnCo_2O_4/ZnCo_2S_4$ composites exhibit favourable interface interactions. The photocatalytic performance of both pure and composite materials is evaluated through water splitting to produce hydrogen and $CO_2$ reduction to yield CO and $CH_4$ using slurry phase and fixed bed photoreactor systems. $ZnCo_2S_4$ NRs demonstrate superior hydrogen production whereas $CO_2$ reduction is more pronounced with $ZnCo_2O_4$. The highest photocatalytic efficiency is achieved using the heterojunction composites attributed to efficient charge carrier separation facilitated by a suitable band structure. The invention underscores the successful synthesis of highly efficient 1D structured materials for photocatalytic applications.

18 Claims, 10 Drawing Sheets

(51) Int. Cl.
  *B01J 37/02* (2006.01)
  *B01J 37/06* (2006.01)
  *B01J 37/10* (2006.01)
  *B01J 37/20* (2006.01)
  *B01J 37/34* (2006.01)
  *C01B 3/04* (2006.01)

(52) U.S. Cl.
  CPC .............. *B01J 35/45* (2024.01); *B01J 35/50* (2024.01); *B01J 37/0236* (2013.01); *B01J 37/06* (2013.01); *B01J 37/10* (2013.01); *B01J 37/20* (2013.01); *B01J 37/34* (2013.01); *C01B 3/042* (2013.01); *C01B 2203/0277* (2013.01); *C01B 2203/1011* (2013.01); *C01B 2203/1052* (2013.01); *C01B 2203/1076* (2013.01)

(58) Field of Classification Search
  CPC ........ B01J 37/0236; B01J 37/06; B01J 37/10; B01J 37/20; B01J 37/34; C01B 3/042; C01B 2203/0277; C01B 2203/1011; C01B 2203/1052; C01B 2203/1076
  USPC ................... 502/222, 329, 524; 977/811, 813
  See application file for complete search history.

(56) References Cited

FOREIGN PATENT DOCUMENTS

| CN | 110465310 | A | * | 11/2019 | ............ B01J 27/043 |
|---|---|---|---|---|---|
| CN | 110563049 | B | * | 11/2021 | ............ B82Y 30/00 |
| CN | 114100636 | A | * | 3/2022 | ............ B01J 27/049 |
| CN | 116851009 | A | * | 10/2023 | ............ B01J 27/043 |
| CN | 117101683 | A | * | 11/2023 | ............ B01J 27/043 |
| KR | 20180096251 | A | * | 8/2018 | ............ C01G 51/40 |

OTHER PUBLICATIONS

Feng Rong et al., "Zinc-cobalt oxides as efficient water oxidation catalysts: the promotion effect of ZnO." Journal of Materials Chemistry A, 3, 4010-4017. (Year: 2015).*

Baiyin Wang et al., "Recent progress in the photocatalytic reduction of aqueous carbon dioxide." Catalysis Today 311, pp. 23-39. (Year: 2018).*

Depeng Zhao et al., "Bifunctional ZnCo2S4@CoZn13 hybrid electrocatalysts for high efficient overall water splitting." Journal of Energy Chemistry 69, pp. 292-300. (Year: 2022).*

Xiuhua Wang et al., "Fabrication of hierarchical NiCo2O4@NiCo2S4 core/shell nanowire arrays by an ion-exchange route and application to asymmetric supercapacitors." Journal of Alloys and Compounds 767, pp. 232-240. (Year: 2018).*

Chunhe Li et al., ZnCo2S4/Zn0.2Cd0.8S Z-scheme heterojunction: Efficient photocatalytic H2 evolution coupling selective oxidation of benzyl alcohol. International Journal of Hydrogen Energy 47, pp. 38951-38963. (Year: 2022).*

Chi-Jung Chang et al., "Improved H2 production of ZnO@ZnS nanorod-decorated Ni foam immobilized photocatalysts." International Journal of Hydrogen Energy 46, pp. 11357-11368. (Year: 2021).*

* cited by examiner

SYNTHESIS AND APPLICATION OF ZINC COBALT OXIDE/SULFIDE NANORODS FOR PHOTOCATALYTIC WATER SPLITTING AND CARBON DIOXIDE REDUCTION

FIELD OF THE INVENTION

The present invention relates to the field of solar-driven photocatalysis, and more particularly to the synthesis and application of bimetallic oxides and sulfides nanocomposites for efficient hydrogen production through water splitting and carbon dioxide reduction applications.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Greenhouse gases are significant contributors to climate change. Carbon dioxide ($CO_2$), a prominent greenhouse gas, significantly contributes to climate change by trapping heat in the atmosphere, leading to global warming and associated environmental disruptions. The primary sources of $CO_2$ emissions are human activities such as the combustion of fossil fuels (coal, oil, and natural gas) for energy, industrial processes, deforestation, and certain agricultural practices. In response to this pressing issue, climate action involves efforts to mitigate greenhouse gas emissions, adapt to climate change impacts, and transition to a low-carbon economy. It encompasses various strategies at local, national, and international levels to reduce $CO_2$ emissions and limit global temperature rise. According to the United Nations (UN) sustainable development goals (SDGs), a global temperature should not exceed 1.5° C. to achieve sustainability. To achieve this goal, one of the possible solutions is to capture and reuse $CO_2$ through a cleaner photocatalysis process.

Photocatalytic $CO_2$ reduction utilizing solar energy emerges as a novel approach to address climate change by converting $CO_2$ into valuable fuels and chemicals using renewable solar power. The photocatalytic process has been shown to be promising in turning $CO_2$ into fuels and chemicals over various semiconductor materials. However, existing semiconductor-based photocatalytic systems often exhibit low efficiency in harnessing solar energy, resulting in suboptimal yields of desired products. Currently, titanium dioxide has been widely used as a photocatalyst but it is active only under UV light and has lower photocatalytic efficiency. There is a growing need to enhance the efficiency of semiconductors' light absorption, charge separation, and catalytic activity, which is crucial to improving overall process efficiency.

Also, in pursuit of achieving sustainability, research activities have increased in the field of sustainable energy sources to come up with environmental-friendly alternatives to fossil fuels. Hydrogen with its sustainability, extended storage capacity, and eco-friendly properties as a green fuel, holds promise as a viable alternative to fossil fuels. Hydrogen is a green fuel because it can be produced using renewable energy sources and emits only water vapour when used in fuel cells or combustion processes. Photocatalytic water splitting is a promising method for hydrogen production using renewable energy sources, such as sunlight. The intriguing approach of photocatalytic water splitting involves harnessing the solar energy using a suitable semiconductor. Photocatalytic water splitting, not only holds promise for efficient $H_2$ production but also stands out for its environmental sustainability, contributing to a net-zero carbon footprint. Various semiconducting photocatalysts, including titanium oxide ($TiO_2$), tungsten oxide ($WO_3$), zinc oxide ($ZnO_2$), and iron oxide ($Fe_2O_3$), have been employed to generate $H_2$ by water splitting. Most of these materials, however, face challenges such as rapid charge recombination, limited surface area, and a wide band gap. Consequently, there is a growing demand for photocatalysts that are both efficient and stable, particularly under visible light conditions, reflecting a notable trend in recent years.

Thus, photocatalysis is a promising approach for $CO_2$ conversion and water splitting to produce green hydrogen. The photocatalyst is a crucial component of the process. It absorbs photons from sunlight and initiates the chemical reactions. Common photocatalysts used for $CO_2$ reduction and water splitting include titanium dioxide ($TiO_2$), graphitic carbon nitride ($g-C_3N_4$), zinc oxide (ZnO), and various metal oxides, sulfides, and nitrides. Researchers are continually exploring new materials with enhanced light absorption, charge separation, and stability for improved efficiency. However, many of these materials are unable to harvest solar energy and have challenges of charge recombination. The bandgap of the photocatalyst determines its ability to absorb light of certain wavelengths. Ideally, the photocatalyst should have a bandgap corresponding to the solar spectrum to maximize light absorption. A suitable photocatalyst needs to be synthesised through band gap engineering and constructing heterojunction. Bandgap engineering involves modifying the composition or structure of the photocatalyst to optimize its bandgap for efficient light utilisation and charge separation. Recently, bimetallic photocatalysts have attracted significant interest due to their potential for photocatalytic activity and stability compared to their monometallic counterparts. Also, sulfur-based catalysts are garnering significant interest in photocatalytic applications due to their unique properties, such as visible light absorption, chemical stability, and catalytic activity. Cadmium sulfide (CdS), zinc sulfide (ZnS), copper sulfide (CuS), and iron sulfide (FeS) are commonly used sulfur-based photocatalysts.

Based on the above explained, there exists a need for synthesising an efficient and low cost photocatalyst for photocatalytic $CO_2$ reduction and $H_2$ production using solar energy, which overcomes the drawbacks of the traditionally employed systems.

SUMMARY OF THE INVENTION

Therefore it is an object of the present invention to propose zinc and cobalt-based bimetallic oxides and sulfides nanocomposites for photocatalytic hydrogen production and carbon dioxide reduction under solar irradiation, which is proved to be cost-effective and highly efficient in performance.

There is disclosed a photocatalyst composition for producing hydrogen ($H_2$) by photocatalytic water splitting and for reducing $CO_2$ into useful chemicals comprising one-dimensional photoactive zinc cobalt oxide nanorods (1D $ZnCo_2O_4$ NRs) of uniform size and shape; one-dimensional photoactive zinc cobalt sulfide nanorods (1D $ZnCo_2S_4$ NRs) of uniform size and shape; and 1D/1D $ZnCo_2O_4/ZnCo_2S_4$ heterojunction nanocomposites exhibiting good interface interactions.

In an embodiment of the present invention, the raw materials for producing the 1D $ZnCo_2O_4$ NRs comprise 0.2 g of zinc acetate ($ZnC_4H_6O_4$), 0.32 g of cobalt nitrate ($Co(NO_3)_2 \cdot 6H_2O$), 0.60 g oxalic acids, urea of double the amount than oxalic acid, 20 mL ethanol and 20 mL DI water.

In another embodiment of the present invention, 0.05 to 0.2 g of $ZnCo_2O_4$, 0.2 to 2 g of thioacetamide and 40 mL DI water act as raw materials for producing the 1D $ZnCo_2S_4$ NRs by replacing oxygen with sulfur.

In an embodiment of the present invention, the raw materials for producing 1D/1D heterojunction $ZnCo_2O_4/ZnCo_2S_4$ composites comprise $ZnCo_2O_4$ and $ZnCo_2S_4$ of equal amounts homogenously dispersed in methanol and oven-dried at 100° C. for 24 hours.

According to the present invention, the 1D $ZnCo_2O_4$ NRs and the 1D $ZnCo_2S_4$ NRs have a spinel crystal structure with zinc, cobalt and respective oxygen or sulfur ions arranged in a lattice and have stability over multiple cycles of photocatalytic reactions.

The 1D/1D $ZnCo_2O_4/ZnCo_2S_4$ heterojunction composites have higher charge separation efficiency, photocatalytic efficiency and stability over multiple cycles compared to single constituent materials $ZnCo_2O_4$ and $ZnCo_2S_4$.

In an embodiment of the present invention, a slurry type photoreactor system under solar energy irradiations is used for the photocatalytic water splitting to produce hydrogen.

In another embodiment of the present invention, a fixed bed photoreactor under solar energy irradiations is used for the photocatalytic $CO_2$ reduction to produce CO and $CH_4$ from $CO_2$.

According to the proposed disclosure, the 1D $ZnCo_2S_4$ NRs are more suitable for hydrogen production than the 1D $ZnCo_2O_4$ NRs due to the presence of sulfur, and the 1D $ZnCo_2O_4$ NRs are more suitable than the 1D $ZnCo_2S_4$ NRs for $CO_2$ reduction due to oxides groups and surface defects.

The 1D/1D $ZnCo_2O_4/ZnCo_2S_4$ heterojunction composites produce the highest $H_2$ production of 290.2 ppm and the highest CO production of 179.24 $\mu molg^{-1}$ than the 1D $ZnCo_2O_4$ and the 1D $ZnCo_2S_4$, according to the present invention.

There is also disclosed a method for synthesizing a photocatalyst composition comprising photoactive zinc and cobalt based oxides and sulfides nanorods of one-dimensional structure, comprising synthesizing zinc cobalt oxide nanorods (1D $ZnCo_2O_4$ NRs) of uniform size and shape using a facile hydrothermal method with specific amounts of raw materials; synthesizing zinc cobalt sulfide nanorods (1D $ZnCo_2S_4$ NRs) of uniform size and shape using a hybrid hydrothermal method with specific amounts of raw materials; and fabricating further 1D/1D $ZnCo_2O_4/ZnCo_2S_4$ heterojunction composites using a self-assembly approach, wherein the photocatalyst composition uses solar energy to produce hydrogen ($H_2$) by photocatalytic water splitting and to convert $CO_2$ into useful chemicals by photocatalytic $CO_2$ reduction.

In an embodiment of the present invention, the hydrothermal method for synthesizing 1D $ZnCo_2O_4$ NRs comprises dissolving 0.2 to 0.5 g of zinc acetate ($ZnC_4H_6O_4$), 0.32 g of cobalt nitrate ($Co(NO_3)_2 \cdot 6H_2O$), 0.60 g of oxalic acid and urea in double amount than oxalic acid in 20 mL of DI water and 20 mL ethanol; heating the solution at 140° C. for 12 hours; washing resultant 1D $ZnCo_2(OH)_2$ nanorods (NRs)m with water or ethanol followed by drying at 80 to 100° C. for 12 to 24 hours; and heating the 1D $ZnCo_2(OH)_2$ NRs at 350° C. for 2 hours.

In an embodiment of the present invention, the hybrid hydrothermal method for synthesizing 1D $ZnCo_2S_4$ NRs comprise mixing 0.05 to 0.2 g of $ZnCo_2O_4$ and 0.2 to 2 g of thioacetamide in 40 mL DI water; heating the suspension at 120-140° C. for 12 to 8 hours; washing resultant product with DI water; and drying it at 100° C. for 24 hours.

In another embodiment of the present invention, the self-assembly approach for synthesizing 1D/1D $ZnCo_2O_4/ZnCo_2S_4$ heterojunction composites comprise homogeneously dispersing equal amounts of $ZnCo_2O_4$ and $ZnCo_2S_4$ in methanol by stirring and ultrasonication; and oven-drying final product at 80 to 100° C. for 12 to 24 hours.

In an embodiment of the present invention, the 1D $ZnCo_2O_4$ NRs and the 1D $ZnCo_2S_4$ NRs have a spinel crystal structure with zinc, cobalt and respective oxygen or sulfur ions arranged in a lattice and have stability over multiple cycles of phtocatalytic reactions.

According to the present invention, the 1D/1D $ZnCo_2O_4/ZnCo_2S_4$ heterojunction composites have higher charge separation efficiency, photocatalytic efficiency and stability over multiple cycles compared to single constituent materials $ZnCo_2O_4$ and $ZnCo_2S_4$.

In an embodiment of the present invention, the photocatalytic water splitting for producing $H_2$ comprise injecting the photocatalyst into a slurry phase photoreactor system integrated with a light source; and analyzing using a micro-GC (fusion).

In another embodiment of the present invention, the photocatalytic $CO_2$ reduction for converting $CO_2$ into CO and $CH_4$ comprise exposing the catalyst and reactants to a light source; maintaining a constant flow rate of high-purity $CO_2$ gas using mass flow controllers; and analyzing using a micro-GC (fusion).

According to the present invention, the 1D $ZnCo_2S_4$ NRs are more suitable for hydrogen production than the 1D $ZnCo_2O_4$ NRs due to the presence of sulfur, and the 1D $ZnCo_2O_4$ NRs are more suitable than the 1D $ZnCo_2S_4$ NRs for $CO_2$ reduction due to oxides groups and surface defects.

The present invention discloses that the 1D/1D $ZnCo_2O_4/ZnCo_2S_4$ heterojunction composites produce the highest $H_2$ production of 290.2 ppm and the highest CO production of 179.24 $\mu molg^{-1}$ than the 1D $ZnCo_2O_4$ and the 1D $ZnCo_2S_4$.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
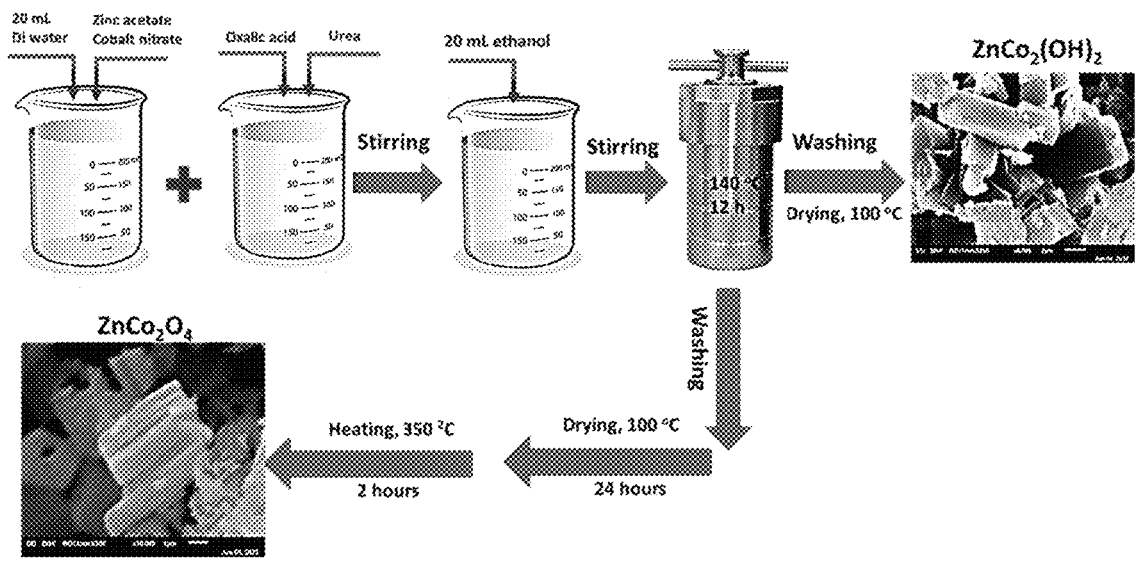
FIG. 1 shows the synthesis of $ZnCo_2(OH)_2$ and $ZnCo_2O_4$ using hydrothermal process, in accordance with the present invention.

The aspects of the proposed zinc and cobalt-based bimetallic oxides and sulfides nanocomposites as photocatalysts—according to the present invention will be described in conjunction with FIGS. 1-10. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes synthesis of zinc cobalt oxide ($ZnCo_2O_4$)/zinc cobalt sulfide ($ZnCo_2S_4$) nanorods as photoactive materials for energy and environment applications. They are synthesized primarily for photocalalytic $CO_2$ reduction into useful products and for photocalalytic water splitting to produce hydrogen, using solar energy. These zinc and cobalt-based semiconductors are produced as one-dimensional structure (1D) nanorods (ie; 1D zinc cobalt oxide nanorods ($ZnCo_2O_4$ NRs), 1D zinc cobalt sulfide nanorods ($ZnCo_2S_4$)) using a facile hydrothermal approach. They serve as low-cost and highly efficient photocatalyst, active under visible light (photoactive). In an embodiment of the invention, it is further proposed the fabrication of 1D/1D $ZnCo_2O_4/ZnCo_2S_4$ hybrid nano-composites using a self-assembly approach. In another embodiment, the present invention also discloses the performance of the pure and the composite zinc cobalt-based oxides and sulfides in photocatalytic water splitting to produce hydrogen and photocatalytic $CO_2$ reduction to produce green fuels such as CO and $CH_4$ under visible light irradiation. These synthesized materials attain higher visible light absorbance over the entire irradiation time.

According to the disclosure, photocatalytic water splitting using the synthesized photocatalysts, that is 1D $ZnCo_2(OH)_4$ NRs, 1D $ZnCo_2O_4$ NRs, and 1D $ZnCo_2S_4$ NRs, results in $H_2$ production of 82.75, 126.62, and 249.22 ppm respectively. Production of $H_2$ is higher over $ZnCo_2S_4$ compared to $ZnCo_2(OH)_4$ and $ZnCo_2O_4$ samples. The highest $H_2$ production is obtained over 1D/1D $ZnCo_2O_4/ZnCo_2S_4$ composites with a yield of 290.2 ppm, which is 1.16, 2.29, and 3.51 folds higher than using pure $ZnCo_2S_4$, $ZnCo_2O_4$ and $ZnCo_2(OH)_4$, respectively. The photocatalytic $CO_2$ reduction with $H_2O$ is able to produce CO and $CH_4$ as the main products over all types of photocatalysts. The CO production of 32.6, 45.42 and 25.91 $\mu mol\ g^{-1}\ h^{-1}$ is obtained over $ZnCo_2(OH)_4$, $ZnCo_2O_4$ and $ZnCo_2S_4$ samples, respectively. Production of CO is higher over zinc cobalt oxides compared to zinc cobalt sulfides. Using 1D/1D $ZnCo_2O_4/ZnCo_2S_4$ composite, the highest CO production of 179.24 $\mu mol\ g^{-1}$ is obtained which is 1.47 folds higher than using $ZnCo_2O_4$ photocatalyst respectively. All these results, thereby confirm the successful fabrication of 1D structured materials and their higher photocatalytic efficiency for water splitting and $CO_2$ reduction applications.

$ZnCo_2O_4$ and $ZnCo_2S_4$ are structured compounds with a cubic crystal structure. These compounds have different properties due to the different elements involved, which is oxygen and sulfur, respectively. The characteristics of $ZnCo_2O_4$(Zinc Cobalt Oxide) are it has a spinel crystal structure, where oxygen ions form a face-centered cubic lattice, and zinc and cobalt ions occupy some of the octahedral and tetrahedral sites within this lattice. $ZnCo_2O_4$ exhibits mixed conductivity, wherein it has both electronic and ionic conductivity. This property makes it potentially useful in various electrochemical applications, such as fuel cells, sensors, and batteries. It has catalytic properties which makes it suitable for catalytic activity, particularly in oxygen reduction reactions (ORR) and oxygen evolution reactions (OER), which are crucial processes in energy conversion devices like fuel cells and water electrolyzers. $ZnCo_2O_4$ exhibits good thermal stability, which is important for many high-temperature applications. $ZnCo_2S_4$(Zinc Cobalt Sulfide), similar to $ZnCo_2O_4$ also possesses a spinel crystal structure in which, instead of oxygen, sulfur ions occupy the anion positions in the lattice. Since $ZnCo_2S_4$ is a semiconductor material, its electrical conductivity lies between that of a conductor and an insulator, making it useful in applications such as photocatalysis, solar cells, and sensors. It exhibits optical properties, including absorption and emission characteristics, depending on its exact composition and structure. As a result, it is potentially useful in optoelectronic devices. Similar to $ZnCo_2O_4$, $ZnCo_2S_4$ also possesses catalytic properties, particularly in hydrogen evolution reactions (HER) and other electrochemical processes. These characteristics of $ZnCo_2O_4$ and $ZnCo_2S_4$, as described herein are of prominence in various fields, particularly the renewable energy and these compounds can be used for applications including energy storage, catalysis, and sensing.

The significance of the present invention is that it provides an approach for the synthesis of visible light active zinc cobalt oxide/sulfides nanorods ($ZnCo_2O_4$ and $ZnCo_2S_4$) as a low-cost and highly efficient photocatalyst puts forward a method of producing $ZnCo_2O_4$ and $ZnCo_2S_4$-based materials for photocatalytic applications, particularly in the realm of $H_2$ production and $CO_2$ reduction using solar energy. Greenhouse gas carbon dioxide ($CO_2$) is a significant contributor to climate change. When $CO_2$ gets released into the atmosphere primarily by human activities such as burning fossil fuels (coal, oil, and natural gas) for energy, industrial processes, deforestation, and agricultural practices, it traps heat, leading to global warming and other climate-related disruptions. The present invention puts forward a method of producing $ZnCo_2O_4$ and $ZnCo_2S_4$-based materials for photocatalytic conversion of greenhouse $CO_2$ gas into green fuels and useful chemicals using renewable solar energy. These semiconductor-based photocatalytic systems, due to their enhanced light absorption, charge separation capabilities and catalytic activity, improves the overall process efficiency in harnessing solar energy and results in higher yields of the desired products.

Hydrogen has a huge potential as a viable alternative to fossil fuels with its sustainability, extended storage capacity, and eco-friendly properties as a green fuel. $H_2$ can be produced efficiently by the process of photocatalytic water splitting that involves harnessing the sunlight using a suitable semiconductor. This process also stands out for its environmental sustainability, contributing to a net-zero carbon footprint. The present approach describes herein, a strategic manipulation of catalyst composition to optimize its performance in hydrogen evolution reactions. $ZnCo_2O_4$, is a p-type semiconductor, and is inexpensive, nontoxic, earth abundant, and has narrow energy band. When compared to single metal oxides, $ZnCo_2O_4$ exhibits greater stability, electron conductivity, and richer redox reaction sites. The $ZnCo_2S_4$ is an n-type semiconductor with narrow energy band (Eg), abundance on earth, environmental friendliness, and low cost. The unique crystal shape and the combined influence of two metal species confer upon $ZnCo_2S_4$ superior photoelectrochemical consistency, electron conductivity, and a greater number of redox reaction sites compared to single metal sulfides such as ZnS and $Co_3S_4$. The advantageous properties render $ZnCo_2O_4$ and $ZnCo_2S_4$-based materials most suitable for photocatalytic applications for $H_2$ production and $CO_2$ reduction and the present invention proposes the synthesis of one dimensional nanorods with higher charge transfer efficiency devoid of charge recombination, larger surface area, suitable band structure, higher visible light absorption, and good stability, for harnessing solar energy for photocatalysis.

The bandgap of a photocatalyst determines its ability to absorb light of certain wavelengths. Ideally, the photocatalyst should have a bandgap corresponding to the solar spectrum to maximize light absorption. The proposes idea suggests synthesis of a suitable photocatalyst through bandgap engineering and constructing heterojunction. Bandgap engineering involves modifying the composition or structure of the photocatalyst to optimize its bandgap for efficient light utilisation and charge separation.

Zinc and cobalt-based bimetallic photocatalysts have potential for enhancing photocatalytic activity and stability compared to their monometallic counterpart. The combination of zinc and cobalt in bimetallic photocatalysts can lead to synergistic effects that enhance the photocatalytic activity. Cobalt ions in the bimetallic photocatalyst can act as redox centres, facilitating the generation, transfer, and utilization of photogenerated charge carriers (electrons and holes) during photocatalysis. This can enhance the efficiency of charge separation and reduce the recombination of electron-hole pairs, leading to improved photocatalytic activity. The introduction of cobalt can also extend the light absorption range of the photocatalyst, leading to improved utilization of solar energy for photocatalytic reactions. The presence of cobalt helps to mitigate photo corrosion of zinc-based photocatalysts, thereby enhancing their long-term performance under photocatalytic conditions. In an embodiment of the invention, bimetallic zinc cobalt oxide ($ZnCo_2O_4$) is used for photocatalytic $CO_2$ reduction and water splitting to produce hydrogen under solar energy. $ZnCo_2O_4$ is a mixed metal oxide semiconductor material that is used as a photocatalyst due to its unique electronic structure and photocatalytic properties. $ZnCo_2O_4$ possesses a spinel crystal structure composed of zinc (Zn), cobalt (Co), and oxygen (O) atoms arranged in a cubic lattice. The electronic structure of $ZnCo_2O_4$ is characterized by the presence of Co (III) and Co (II) oxidation states, as well as oxygen vacancies, which contribute to its photocatalytic activity. $ZnCo_2O_4$ exhibits broad absorption in the visible region of the electromagnetic spectrum, which allows it to harness sunlight for photocatalytic reactions. This is attributed to the presence of d-d transition bands associated with the Co ions in the crystal structure. $ZnCo_2O_4$ exhibits a suitable band structure for promoting charge separation, with photogenerated electrons transferring to the conduction band and holes remaining in the valence band.

Bimetallic sulfur-based photocatalysts, which incorporate two different metals along with sulfur, exhibits enhanced photocatalytic activity and selectivity compared to their monometallic counterparts. In another embodiment of the present invention, $ZnCo_2S_4$, or zinc cobalt sulfide, which is a ternary metal sulfide compound is used for photocatalysis due to the unique properties of three materials. $ZnCo_2S_4$ crystallizes in a cubic spinel structure, consisting of zinc (Zn), cobalt (Co), and sulfur (S) atoms arranged in a lattice. In the spinel structure, cobalt ions occupy both tetrahedral and octahedral sites, while zinc ions occupy only octahedral sites. Thus, $ZnCo_2S_4$ is made suitable for photocatalytic $CO_2$ reduction and water splitting to produce hydrogen under solar energy.

An embodiment of the present invention combines $ZnCo_2O_4$ with $ZnCo_2S_4$ to construct $ZnCo_2O_4/ZnCo_2S_4$ composites, that provides the properties of both metal oxides and metal sulfides. The combination of $ZnCo_2O_4$ and $ZnCo_2S_4$ in a composite material leads to synergistic effects, enhancing the photocatalytic activity and stability compared to individual components. The different electronic properties and band structures of the two phases can promote efficient charge separation and utilization of visible light for photocatalytic reactions.

In an embodiment of the disclosure herein, one-dimensional bimetallic zinc cobalt hydroxide nanorods (1D $ZnCo_2(OH)_2$ NRs), one-dimensional bimetallic zinc cobalt hydroxide nanorods (1D $ZnCo_2O_4$ NRs) and one-dimensional trimetallic zinc cobalt sulfide nanorods (1D $ZnCo_2S_4$ NRs) are synthesized using facile hydrothermal methods. In another embodiment of the invention, the performance of these photocatalysts are tested for photocatalytic $CO_2$ reduction to produce fuels as well as water splitting to produce hydrogen ($H_2$) in a fixed bed and slurry phase photoreactor systems respectively. The invention proposes in an embodiment, constructing 1D/1D heterojunctions of $ZnCo_2O_4/ZnCo_2S_4$ composites with good interface interactions and investigating the influential effects of 1D $ZnCo_2O_4$ and 1D $ZnCo_2S_4$. According to the disclosure, $ZnCo_2O_4$ is suitable for photocatalytic $CO_2$ reduction, whereas $ZnCo_2S_4$ is more beneficial for solar hydrogen production. However, the highest photocatalytic efficiency is achieved using the heterojunction composites due to efficient charge carrier separation with a suitable band structure to maximize the photocatalytic efficiency.

In an embodiment of the present invention, a hydrothermal method with specific amounts of raw materials such as zinc acetate, cobalt nitrate, urea and oxalic acids of their specific ratios, is used to grow one dimensional zinc cobalt oxide nanorods (1D $ZnCo_2O_4$ NRs) of uniform size and shape. The hydrothermal method involves, synthesis of 1D $ZnCo_2(OH)_2$ nanorods as well. For the synthesis of $ZnCo_2(OH)_2$ and $ZnCo_2O_4$, the chemicals used are zinc acetate, cobalt nitrate, oxalic acid, urea and ethanol with their high-purity grade. FIG. 1 shows a schematic illustration of the synthesis of $ZnCo_2(OH)_2$ and $ZnCo_2O_4$ using the hydrothermal method according to the present embodiment of the invention. The $ZnCo_2(OH)_2$ is synthesized using the following steps. First, 0.2 g of zinc acetate ($ZnC_4H_6O_4$) with 0.32 g of cobalt nitrate ($Co(NO_3)_2 \cdot 6H_2O$) are dissolved with 20 mL of DI water (Deionized water) under continuous stirring. The amount of zinc acetate and cobalt nitrate can be adjusted to get different morphologies of the final products. After stirring the mixture for 30 minutes to get a clear solution, a specific amount of oxalic acid (0.60 g) is added to the above solution and stirred well for another 30 minutes. In the next stage, double the amount of urea than oxalic acid, is added to the above solution under continuous stirring. In the final stage, 20 mL ethanol is added to the above solution and after stirring for 30 minutes, it is transferred to a Teflon-lined autoclave. The autoclave is transferred to the furnace, and it is heated at 140° C. for 12 h. The final product is rinsed repeatedly with water and ethanol before being dried at 100° C. to get the final pink colour product of 1D $ZnCo_2(OH)_2$ nanorods (NRs). For the synthesis of $ZnCo_2O_4$, a specific amount (0.5 to 1 g) of $ZnCo_2(OH)_2$, washed and then dried at 100° C. for 24 h in the previous step is used. $ZnCo_2(OH)_2$ is heated at 350° C. for 2 hours. The final product obtained is of a blackish colour, which is 1D $ZnCo_2O_4$ nanorods or 1D $ZnCo_2O_4$ NRs.

Figure 2:
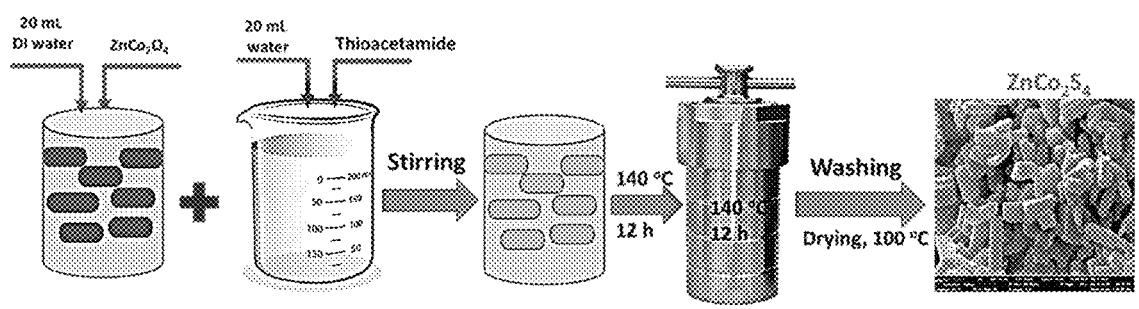
FIG. 2 shows the synthesis of $ZnCo_2S_4$ using hydrothermal process, in accordance with the present invention.

In an embodiment of the present invention, a hybrid approach of double hydrothermal method is used for the synthesis of one-dimensional zinc cobalt sulfide nanorods ((1D $ZnCo_2S_4$ NRs)) of uniform size and shape. In this case, 1D $ZnCo_2O_4$ NRs of uniform size and shape acts as the raw material and the additional precursors employed is thioacetamide as the source of sulfur. Using hybrid hydrothermal method, oxygen gets replaced with sulfur producing 1D $ZnCo_2S_4$ NRs with the same size and shape but with higher solar energy harvesting efficiency and products selectivity. FIG. 2 shows a schematic illustration of the synthesis of $ZnCo_2S_4$ nanorods using the hydrothermal process according to the present embodiment of the invention. The hydrothermal process uses $ZnCo_2O_4$ and thioacetamide, as the raw materials. A specific amount of $ZnCo_2O_4$ (0.05 to 0.2 g) is dispersed in 40 mL DI water under stirring. In the next stage, a specific amount of thioacetamide (0.2 to 2 g) is added to the above suspension and is stirred for 30 minutes. The mixture is then placed in a Teflon-lined autoclave and heated at 140° C. for 12 hours. The product is centrifuged, washed with DI water, and dried at 100° C. for 24 hours to get one-dimensional (1D) nanorods of $ZnCo_2S_4$.

Figure 3:
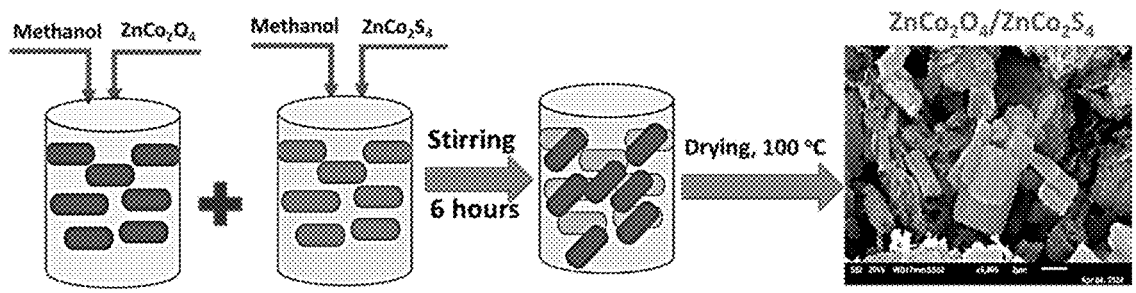
FIG. 3 shows the synthesis of $ZnCo_2O_4/ZnCo_2S_4$ composite using self assembly approach, in accordance with the present invention.

In another embodiment of the present invention, the hybrid composites of 1D/1D $ZnCo_2O_4/ZnCo_2S_4$ nanorods is synthesized using a self-assembly approach. The self-assembly process involves bringing together $ZnCo_2O_4$ and $ZnCo_2S_4$ together under specific conditions to allow them to interact and form a composite material. FIG. 3 shows a schematic illustration of the synthesis of $ZnCo_2O_4/ZnCo_2S_4$ nanotextures using the self-assembly approach, as per the embodiment of the invention. Equal amounts of $ZnCo_2O_4$ (e.g., 0.5 g) and $ZnCo_2S_4$ (e.g., 0.5 g) are dispersed in methanol and the mixture is subjected to stirring for 6 h and ultrasonication to ensure homogenous dispersion. The final product is oven-dried at 100° C. for 24 hours and 1D/1D $ZnCo_2O_4/ZnCo_2S_4$ nanorods are obtained.

The crystal structure of the samples of 1D $ZnCo_2(OH)_2$, $ZnCo_2O_4$, $ZnCo_2S_4$ and 1D/1D $ZnCo_2O_4/ZnCo_2S_4$ nanorods are analysed for characterization of their structure, in different embodiments of the present disclosure. The samples are subjected to X-ray diffraction (XRD) in an embodiment. A Rigaku Bruker Advance D8 X-ray diffractometer, which has a 40-kV working voltage and a 40-mA working current is used for XRD. The morphological and structural characteristics of the pure and composite materials is examined through the application of Scanning Electron Microscopy (SEM), utilizing the JEOL 6010 PLUS/LA apparatus. X-ray photoelectron spectroscopy (XPS) is employed as an embodiment, to ascertain the elemental states and an Axis ultra-DLD Shimadzu is used for the purpose. All of the elements' high-resolution peaks are calibrated using the binding energy of C 1s, which is 284.60 eV. The efficiency of materials charge separation is assessed through photoluminescence (PL) spectroscopy employing a 325 nm wavelength laser from HORIBA Scientific, in an embodiment. Additionally, a Raman investigation is conducted using a HORIBA Scientific Spectrophotometer and a 532 nm laser to explore the interaction among composite elements. UV-visible diffuse reflectance absorbance spectra is also conducted using Carry 100 Agilent UV-vis spectrophotometer (model #G9821A).

Both 1D $ZnCo_2O_4$ NRs and 1D $ZnCo_2S_4$ NRs have a larger surface area, higher visible absorption, efficient charge production, suitable band structure and good stability. The hybrid sulfides/oxides ($ZnCo_2O_4/ZnCo_2S_4$ NRs) composites are found to have higher charge separation efficiency and photocatalytic efficiency when compared to single materials.

Figure 4A:
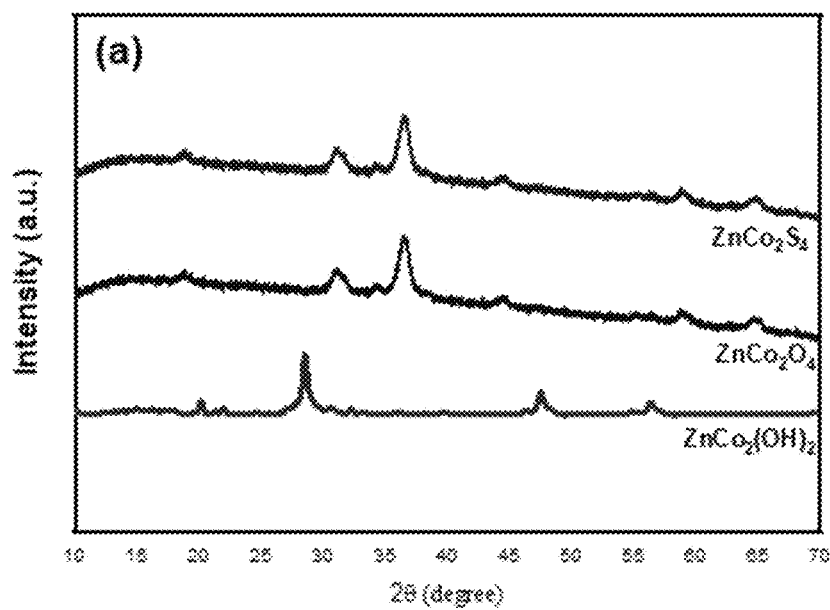
FIG. 4A shows XRD analysis of $ZnCo_2(OH)_2$, $ZnCo_2O_4$ and $ZnCo_2S_4$ samples, in accordance with the present invention.
Figure 4B:
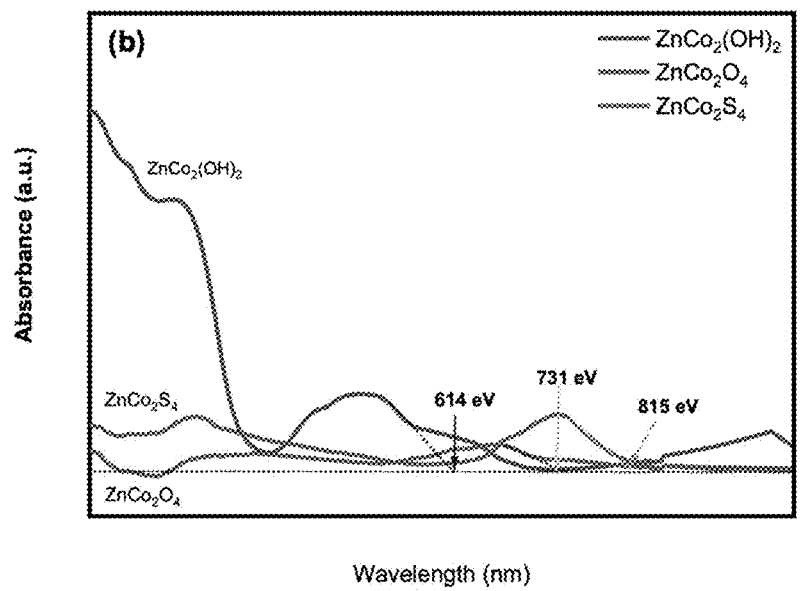
FIG. 4B shows UV-visible analysis of $ZnCo_2(OH)_2$, $ZnCo_2O_4$ and $ZnCo_2S_4$ samples, in accordance with the present invention.
Figure 4C:
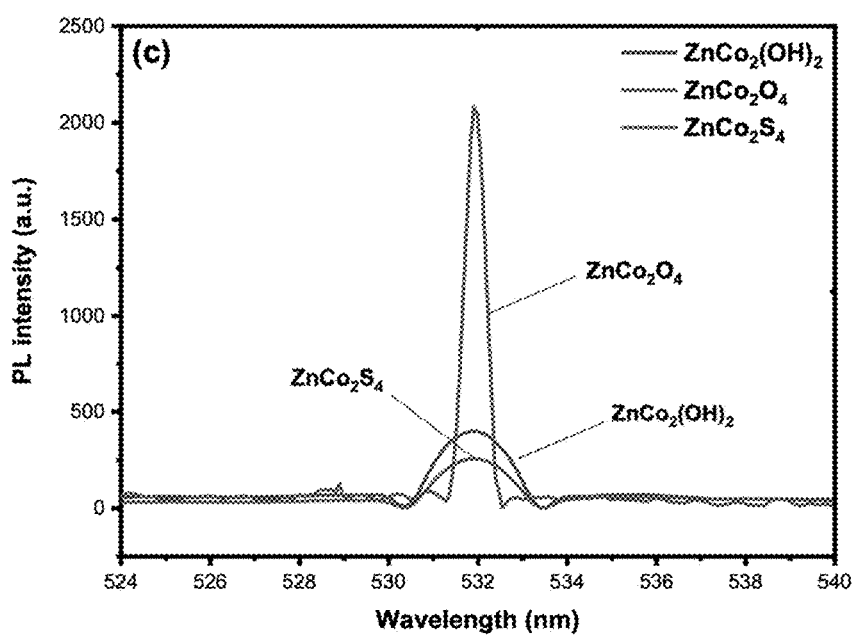
FIG. 4C shows PL analysis of $ZnCo_2(OH)_2$, $ZnCo_2O_4$ and $ZnCo_2S_4$ samples, in accordance with the present invention.

FIG. 4A shows XRD patterns of $ZnCo_2(OH)_2$, $ZnCo_2O_4$ and $ZnCo_2S_4$ samples. For the bare $ZnCo_2(OH)_2$, the XRD signals have appeared at 2θ of 20.18°, 28.54°, 47.53°, and 56.44°, which confirms the synthesis of zinc cobalt hydroxide. When $ZnCo_2(OH)_2$ is heated at 350° C., for two hours, the peaks are shifted towards higher 2θ values to produce zinc cobalt oxide ($ZnCo_2O_4$). The signals at 31.17°, 36.46°, 44.60°, 58.980 and 64.89° of $ZnCo_2O_4$ are assigned to the (2 2 0), (3 1 1), (4 0 0), (5 1 1) and (4 4 0) crystal planes, respectively and similar results are reported previously. This shows the successful synthesis of $ZnCo_2O_4$ with high purity and crystallinity. When the sulfur (S) is added to $ZnCo_2(OH)_2$, it produces similar peaks, however, oxygen is replaced with sulfur to produce $ZnCo_2S_4$. Using UV-vis diffuse reflection spectroscopy (DRS), the optical performance of the synthesized samples, $ZnCo_2(OH)_2$, $ZnCo_2O_4$ and $ZnCo_2S_4$ are measured, and the results are as shown in FIG. 4B. The absorption edges of 614 nm, 731 nm and 815 nm are obtained for $ZnCo_2(OH)_2$, $ZnCo_2O_4$ and $ZnCo_2S_4$ samples, respectively. It is interesting to note that all these samples show absorbance in the visible region, which could help with photocatalytic $CO_2$ reduction and $H_2$ generation performance. The band gaps of $ZnCo_2(OH)_2$, $ZnCo_2O_4$ and $ZnCo_2S_4$ are determined to be 2.09, 1.70 eV and 1.52 eV, respectively. Previously, $ZnCo_2O_4$ is analyzed through UV-visible and similar results are obtained. FIG. 4C shows the PL spectra of $ZnCo_2(OH)_2$, $ZnCo_2O_4$ and $ZnCo_2S_4$ samples. Using $ZnCo_2(OH)_2$, lower peak intensity is observed, which is possibly due to lower production of charges. However, a higher peak intensity is obtained for $ZnCo_2O_4$ due to more production and recombination of charge carriers. This reveals the semiconducting characteristics of zinc cobalt oxide. Furthermore, in the case of $ZnCo_2S_4$, the peak intensity is significantly dropped, which may be due to lower production of charges or their less recombination in the presence of sulfur. In the literature, peak intensity for $ZnCo_2O_4$ is not observed, however, in the current disclosure, due to morphological difference and 1D structure, an obvious peak is obtained. The morphology of the materials is further investigated using scanning electron microscopy (SEM) and the results are obtained. The morphology of $ZnCo_2(OH)_2$ shows large size one dimensional (1D) nanorods. It is observed that all the rods are uniform in size and shape, which are produced using the hydrothermal approach with a specific ratio of Zn/Co and oxalic acid/urea. Similarly, the morphology of $ZnCo_2O_4$ presents that the $ZnCo_2O_4$ consists of 1D nanorods and all of them are in uniform size and shape, which are produced after heating the $ZnCo_2(OH)_2$ at 350° C. for two hours. This reveals the successful fabrication of zinc cobalt hydroxide and zinc cobalt oxide using a facile hydrothermal method. Furthermore, the SEM images of $ZnCo_2S_4$ shows that, similar to 1D $ZnCo_2O_4$ nanorods, $ZnCo_2S_4$ also consists of 1D nanorods with uniform size and shape, which are synthesized using the hydrothermal method with thioacetamide as the sulfur precursor. However, the surface of 1D $ZnCo_2S_4$ is rough compared to the smooth surface of $ZnCo_2O_4$ nanorods, which is possibly due to the replacement of oxygen with sulfur and also due to treating $ZnCo_2O_4$ with water as the solvent at high temperature.

Figure 5A:
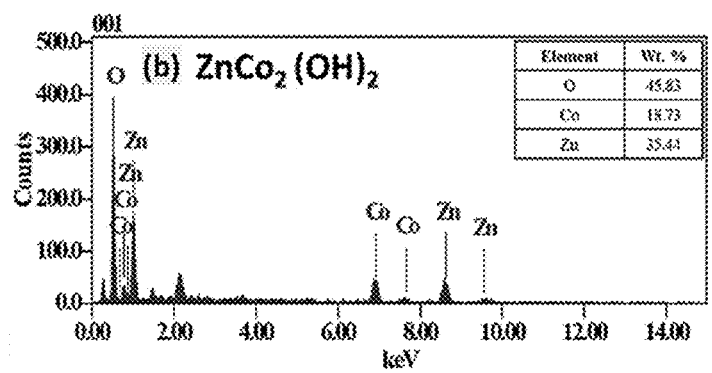
FIG. 5A, FIG. 5B and FIG. 5C show EDX analysis of $ZnCo_2(OH)_2$, $ZnCo_2O_4$ and $ZnCo_2S_4$ samples respectively, in accordance with the present invention.
Figure 5B:
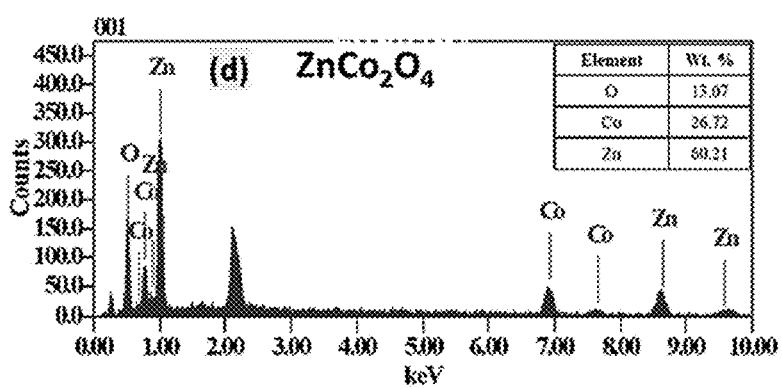
Figure 5C:
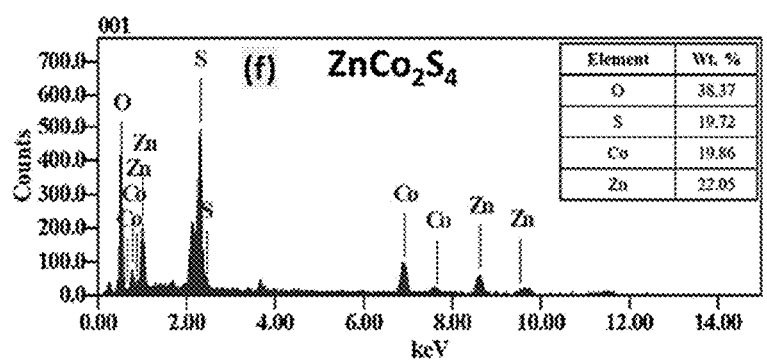

The EDX analysis of the $ZnCo_2(OH)_2$, $ZnCo_2O_4$ and $ZnCo_2S_4$ samples is further conducted, and their results are presented in FIG. 5A, FIG. 5B and FIG. 5C. FIG. 5A shows EDX spectra of 1D $ZnCo_2(OH)_2$ nanorods. The elements observed are Zn, Co, and O with their composition of 35.44%, 18.73% and 45.83%, respectively. On the other hand, FIG. 5B shows the EDX spectrum of 1D $ZnCo_2O_4$ nanorods. The elements observed are Zn, Co and O with their compositions of 60.21%, 26.72% and 13.07%, respectively. It can be observed that higher oxygen is observed in $ZnCo_2(OH)_2$ due to the presence of water absorbed and hydroxyl groups, due to use as synthesizing material without calcination. Comparatively, a higher amount of Zn and Co is observed in the $ZnCo_2O_4$ sample, due to heating the precursor at 350° C. for 2 hours, which is useful to remove water and also some adsorbed oxygen. The EDX results of $ZnCo_2S_4$ are shown in FIG. 5C. EDX spectra show the peaks of Zn, Co, S and O elements with their compositions of 22.05%, 19.86%, 19.72% and 38.37%, respectively. These results are different from the composition of $ZnCo_2(OH)_2$ and $ZnCo_2O_4$. The composition of Zn and Co is decreased in $ZnCo_2S_4$ samples due to adding the sulfur, however, the amount of oxygen is increased compared to $ZnCo_2O_4$ due to using water for the synthesis and also because of using the sample without heating, in which possible oxygen and OH groups would be adsorbed. In general, all of these results confirm successful synthesis of $ZnCo_2(OH)_2$, $ZnCo_2O_4$ and $ZnCo_2S_4$ samples and can be further used for photocatalytic applications.

Figure 6:
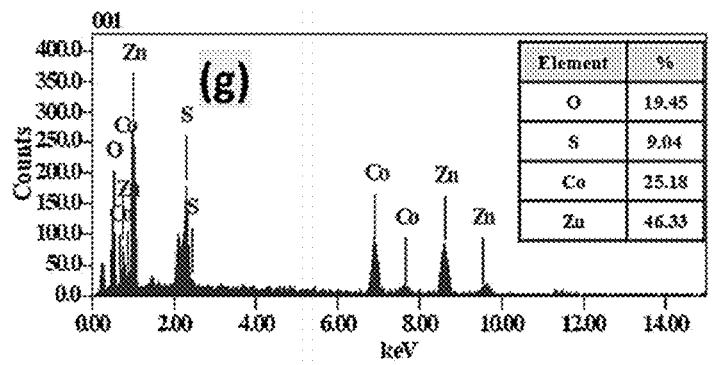
FIG. 6 shows the EDX spectra of $ZnCo_2O_4/ZnCo_2S_4$ composite with element composition, in accordance with the present invention.

The morphology of 1D/1D $ZnCo_2O_4$/$ZnCo_2S4$ heterojunction composite is obtained and investigated using scanning electron microscopy (SEM). The composite consists of 1D nanorods of $ZnCo_2O_4$ and 1D nanorods of $ZnCo_2S_4$ to produce 1D/1D heterojunction. A good interface interaction between $ZnCo_2O_4$/$ZnCo_2S_4$ nanorods is observed due to using a self-assembly approach in the synthesis. Both materials also have identical morphology as discussed previously, however, their structure is slightly altered due to continuous stirring. The EDX mapping analysis of $ZnCo_2O_4$/$ZnCo_2S$4 shows that all the elements Zn, Co, S and O are uniformly and entirely distributed over the composite surface. The distribution of Zn, Co, S and O elements is further investigated through colour images and it further confirms their unfirm distribution within the composite samples. FIG. 6 shows the EDX spectrum of $ZnCo_2O_4$/$ZnCo_2S4$, which confirms the presence of Zn, Co, S and O elements. The compositions of Zn, Co, S and S obtained are 46.33%, 25.18%, 9.04% and 19.45%. These results are in good agreement with the previous results of the pure $ZnCo_2O_4$ and $ZnCo_2S_4$ samples. Compared to $ZnCo_2S_4$, the amount of S is decreased, whereas the amount of Zn and O are increased due to adding $ZnCo_2O_4$ to synthesize $ZnCo_2O_4$/$ZnCo_2S4$ composite. All these results confirm the successful synthesis of the composite materials and is useful for producing 1D/1D heterojunctions with higher photocatalytic efficiency.

Figure 7A:
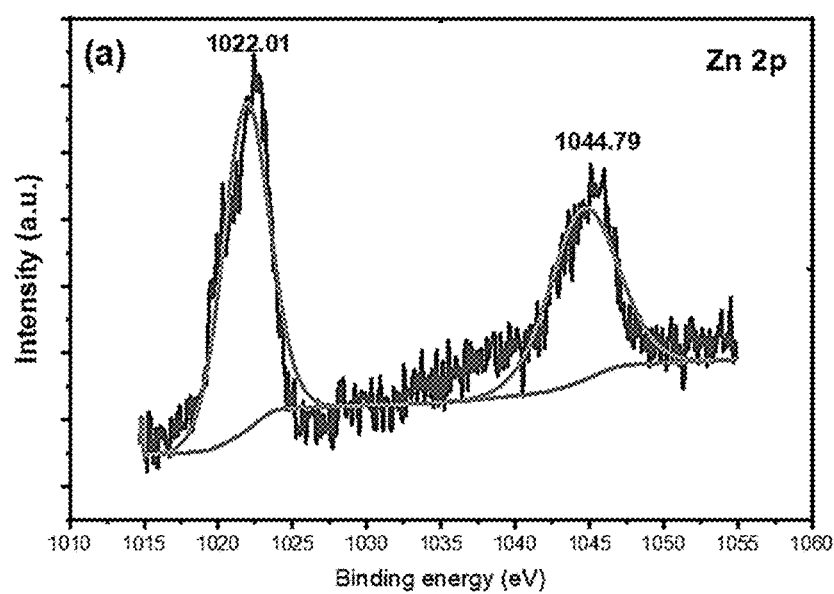
FIG. 7A, FIG. 7B, FIG. 7C, FIG. 7D and FIG. 7E show XPS analysis of Zn 2p, C 1s, Co 2p, O 1s and S 2p for $ZnCo_2S_4$, in accordance with the present invention.
Figure 7B:
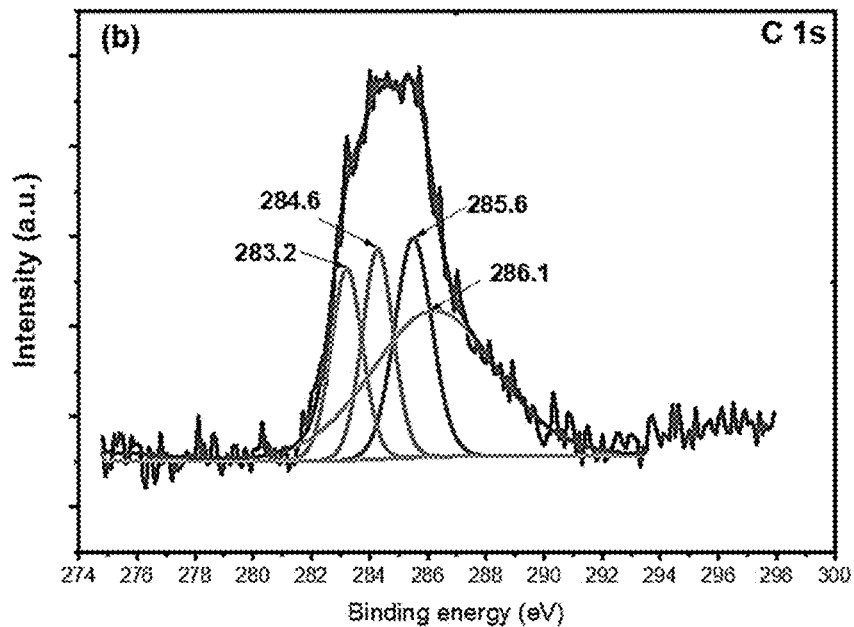
Figure 7C:
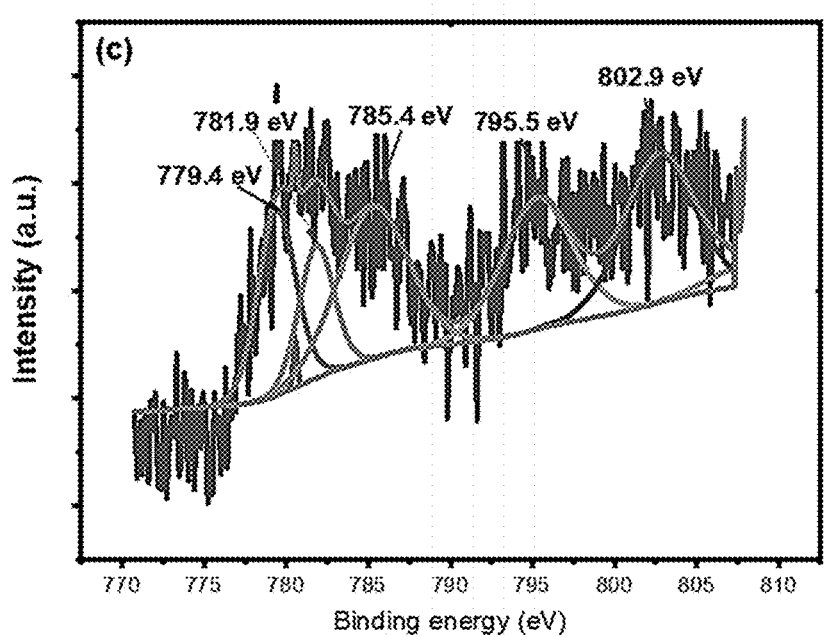
Figure 7D:
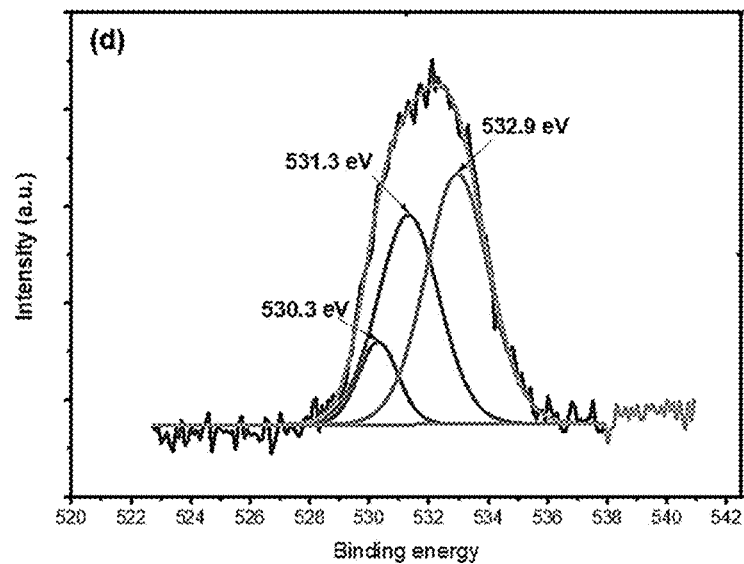
Figure 7E:
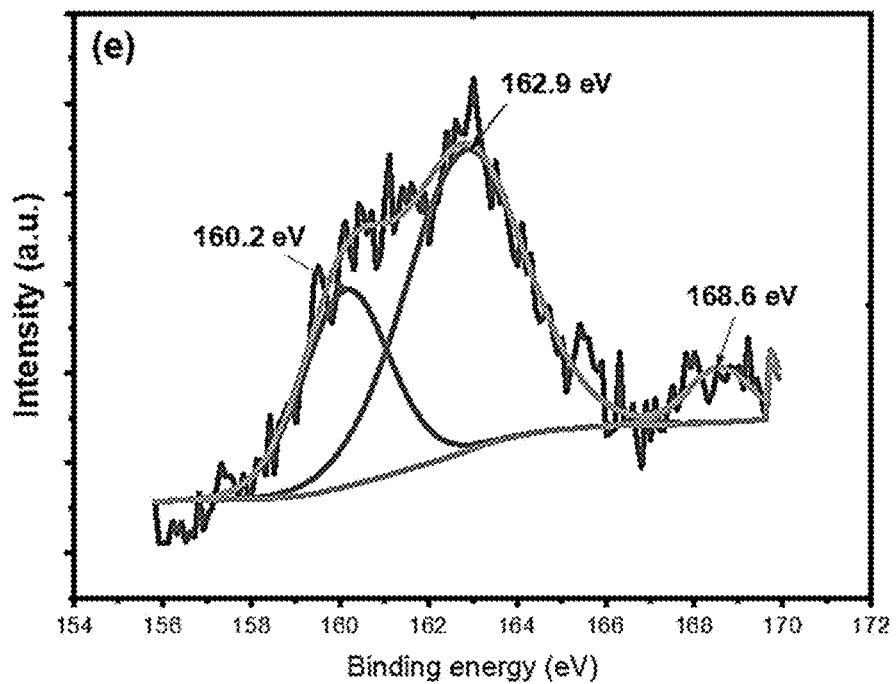
Figure 7F:
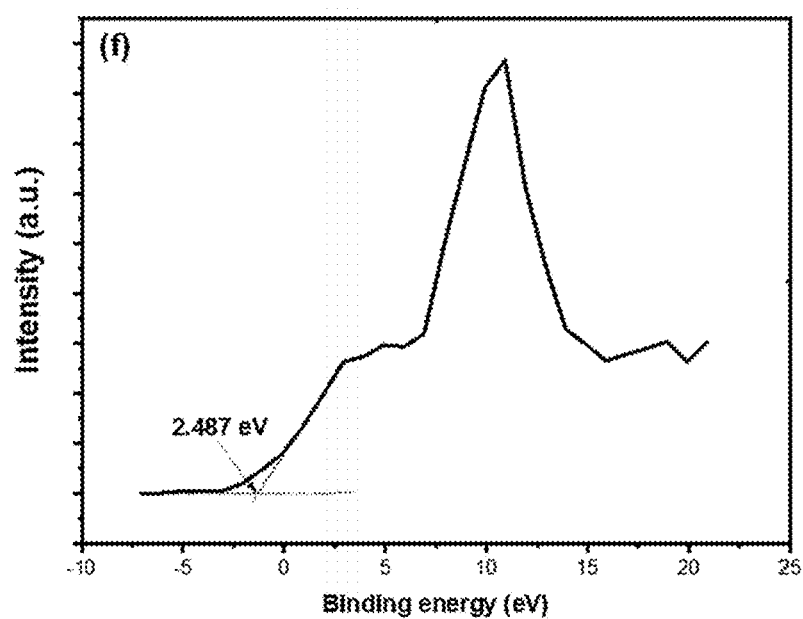
FIG. 7F shows XPS analysis of wide spectra for valance band position for $ZnCo_2S_4$, in accordance with the present invention.

The elemental state is further investigated using XPS analysis and the results are shown in FIG. 7A-7F. FIG. 7A shows the XPS spectra of Zn 2p with binding energies 1022.01 eV and 1044.79 eV, associated with Zn $2p_{3/2}$ and Zn $2p_{1/2}$, respectively. The corresponding difference of 22.64 eV, confirms the existence of Zn (II) valence ions ($Zn^{2+}$) FIG. 7B shows XPS analysis of C1 s with four peaks having binding energies 283.2 eV, 284.6 eV, 285.6 eV and 286.1 eV. The peak at 283.2 eV is ascribed to carbon attached with some intermediates, whereas the other three peaks with binding energies 284.6 eV, 285.6 eV and 286.1 eV can be attributed to C—C, C—O and C=O, respectively. FIG. 7C shows XPS spectra of Co 2p with binding energies 779.4 eV, 781.9 eV, 785.4 eV, 795.5 eV and 802.9 eV. The peak at 779.4 eV identifies the existence of cobalt as the metallic state. The peaks at 781.9 eV and 795.5 eV are attributed to the existence of $CO_2^+$ and $Co^{3+}$ with satellite peaks having binding energies of 785.4 eV and 802.9 eV. FIG. 7D shows XPS spectra of O 1s with binding energies 530.3 eV, 531.3 eV and 532.9 eV, ascribed to crystal lattice oxygen, adsorbed oxygen and oxygen vacancies, respectively. The XPS spectrum of S 2p is shown in FIG. 7E with binding energies 160.2 eV, and 162.9 eV with typical S $2p_{3/2}$ and S $2p_{1/2}$ relevant features, which can be ascribed to corresponding metal sulfides ($S^{2-}$) with 168.6 eV satellite peak. All these results show the presence of elements as $Zn^{2+}$, $CO_2^+$, $Co^{3+}$ and $S^{2-}$ in the $ZnCo_2S_4$ nanorods. Furthermore, FIG. 7F shows wide spectra with a valance band position of 2.487 eV for the $ZnCo_2S_4$, and it can be used to calculate the conductance band with the help of band gap energy.

In an embodiment of the present invention, the pure zinc, cobalt-based materials, and the hybrid nanotextures are tested for photocatalytic water splitting to produce hydrogen and photocatalytic $CO_2$ reduction to produce green fuels for the climate action with higher efficiency and products selectivity. In one embodiment, 1D $ZnCo_2O_4$ NRs are promising to effectively convert $CO_2$ to green fuels in a fixed bed photoreactor under solar energy irradiations. The materials have suitable redox potentials to produce CO and $CH_4$ with their higher photoactivity and stability. 1D $ZnCo_2O_4$ NRs are promising for efficient photocatalytic water splitting to produce hydrogen in a slurry type photoreactor system under solar energy irradiations. The materials have suitable redox potentials to produce hydrogen with higher photoactivity and stability. In another embodiment of the present invention, 1D $ZnCo_2S_4$ NRs are promising to effectively convert $CO_2$ to green fuels in a fixed bed photoreactor under solar energy irradiations. The materials have suitable redox potentials to produce CO and $CH_4$ with their higher photoactivity and stability. In an embodiment of the invention, 1D $ZnCo_2S_4$ NRs are promising for efficient photocatalytic water splitting to produce hydrogen in a slurry type photoreactor system under solar energy irradiations. The materials have suitable redox potentials to produce hydrogen with higher photoactivity and stability. Comparatively, 1D $ZnCo_2S_4$ NRs are more promising for hydrogen production due to the presence of sulfur, whereas 1D $ZnCo_2O_4$ NRs are more promising for $CO_2$ reduction due to oxides groups and surface defects. In another embodiment of the disclosure, the hybridizing 1D $ZnCo_2O_4$ NRs/1D $ZnCo_2S_4$ NRs are found to be promising for $CO_2$ reduction to CO and $CH_4$, and water splitting to produce hydrogen under the same reaction conditions. 1D $ZnCo_2O_4$ NRs and 1D $ZnCo_2S_4$ NRs are also found to be stable in multiple cycles for continuous hydrogen production.

As mentioned, in an embodiment of the invention, pure 1 D $ZnCo_2(OH)_2$, 1 D $ZnCo_2O_4$ and 1 D $ZnCo_2S_4$ NR samples and the hybrid composites of 1D $ZnCo_2O_4$ NRs/1D $ZnCo_2S_4$ NRs are tested for both photocatalytic water splitting to produce hydrogen and $CO_2$ reduction to produce green fuels such as CO and $CH_4$. For photocatalytic water splitting for hydrogen production, a slurry phase Pyrex glass photoreactor system having a total volume of 60 mL is used to examine the performance of all the photocatalysts. A 500 W Xenon lamp serves as the visible light source with a light intensity of 100 mW/cm$^2$. 25 mg of photocatalyst is disseminated in a 5 vol % aqueous solution of methanol as sacrificial reagents having a total volume of 50 mL and homogenized by magnetic stirring. Utilizing a vacuum flow system and constant nitrogen flow, the reactor and piping systems are cleaned, and efficiency is determined based on the amount of hydrogen produced. The online micro-GC (Gas Chromatography) fusion is integrated with the reactor for the continuous analysis of the amount of $H_2$ produced. GC is installed with two Thermal Conductivity Detectors (TCDs) connected with argon and helium carrier gases and products are injected into GC after 20 minutes of interval.

Figure 8:
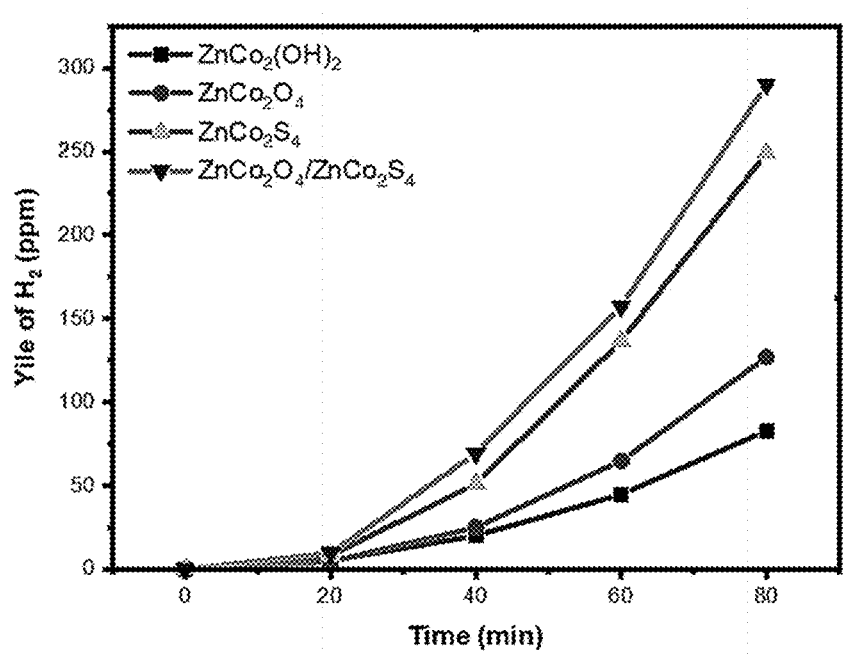
FIG. 8 shows the photocatalytic hydrogen production with $ZnCo_2(OH)_2$, $ZnCo_2O_4$, $ZnCo_2S_2$ and $ZnCo_2O_4/ZnCo_2S_4$ composites, in accordance with the present invention.

In a slurry photoreactor with 5% methanol as the sacrificial reagents and 25 mg of photocatalyst loading, the performance of all the samples is conducted and the results are shown in FIG. 8. Initially, for the first 20 minutes, the lower yield of $H_2$ is obtained, which is significantly increased after 60 minutes but these trends are continuously increasing over the reaction time. The lower amount of hydrogen production at the beginning could be due to the existence of an activation process of the photocatalyst. Another possible reason can be due to using a continuous process with online injection of samples to GC after 20 minutes of interval. In this case, there is no accumulation of hydrogen in the reactor and the pipelines which are connected to GC. For example, in the initial injection, only a small portion reaches GC, whereas, with increasing reaction time, hydrogen is reached in sufficient quantity to GC inlet, resulting in a higher production rate. Previously, similar patterns are obtained during photocatalytic water splitting to produce $H_2$ in a continuous flow photoreactor system. The amount of hydrogen produced over $ZnCo_2(OH)_4$ is 82.75 ppm, which is produced after 80 minutes of reaction time with 25 mg of catalyst loading and 5 vol. % sacrificial reagents. This shows that $ZnCo_2(OH)_4$ have semiconducting characteristics and enables to production significant amount of hydrogen. Furthermore, the production of hydrogen is increased to 126.62 ppm with 1D $ZnCo_2O_4$ NRs photocatalyst, which is 1.53 folds higher than using 1D $ZnCo_2(OH)_4$ NRs under the same reaction conditions and catalyst loading. This increase in hydrogen production is due to more production of photo-induced charge carriers in $ZnCo_2O_4$ as evidenced by PL analysis. A further increase in hydrogen production is obtained with $ZnCo_2S_4$ with hydrogen production of 249.22 ppm. This reveals, that introducing sulfur is beneficial to promoting hydrogen production. This amount of hydrogen production is 3.01 and 1.97 folds more than using $ZnCo_2(OH)_4$ and $ZnCo_2O_4$ samples, respectively. Previously, the $H_2$ production rate of 123 μmol g$^{-1}$ h$^{-1}$ is obtained with $ZnCo_2O_4$ nanoparticles using a 300 W Xe lamp with 20 vol % of triethanolamine (TEOA) in a batch process.

The performance of $ZnCo_2O_4$ and $ZnCo_2S_4$ photocatalysts is further investigated by constructing 1D/1D heterojunctions and their results are presented in FIG. 8. Like $ZnCo_2O_4$ and $ZnCo_2S_4$, continuous hydrogen production is obtained with the binary composites. The maximum hydrogen amount of 290.2 ppm is obtained with 1D/1D $ZnCo_2O_4$/$ZnCo_2S_4$ composite. This amount of hydrogen production is 1.16, 2.29, and 3.51 folds more obtained than using $ZnCo_2S_4$, $ZnCo_2O_4$ and $ZnCo_2(OH)_4$ samples, respectively. This significantly enhanced photocatalytic efficiency is due to the efficient production and separation of charge carriers over the binary 1D/1D $ZnCo_2O_4$/$ZnCo_2S_4$ composite under visible light irradiation.

In another embodiment of photocatalytic $CO_2$ reduction, a fixed bed photoreactor system is used to examine the performance of all the photocatalysts. The photocatalytic system consists of an online product analysis system, a central reactor chamber, and mass flow controllers (MFC). The main light source, a 300 W Xenon lamp, is positioned at the top of the reactor glass window and generates light with an intensity of 100 mW/cm$^2$. A water saturator is incorporated into the reactor system to transport $CO_2$ and water vapors. In every experiment, 150 mg of powder catalyst is utilized, evenly distributed inside the reactor bottom surface. The primary exposed region is the bottom surface of the reactor chamber, which is where the catalyst, reactants, and light source interact. During each experiment, the MFC maintains a constant flow rate of high-purity $CO_2$ gas at 20 mL/min. Before the commencement of testing, a feed mixture comprising $CO_2$ and $H_2O$ is continuously circulated through the reactor for 30 minutes to ensure thorough saturation of the catalyst surface. The products are analyzed using GC-TCD (thermal conductivity detectors)/FID (flame-ionisation detectors) connected with different columns for the identification of CO, $CH_4$ and other products.

Figure 9:
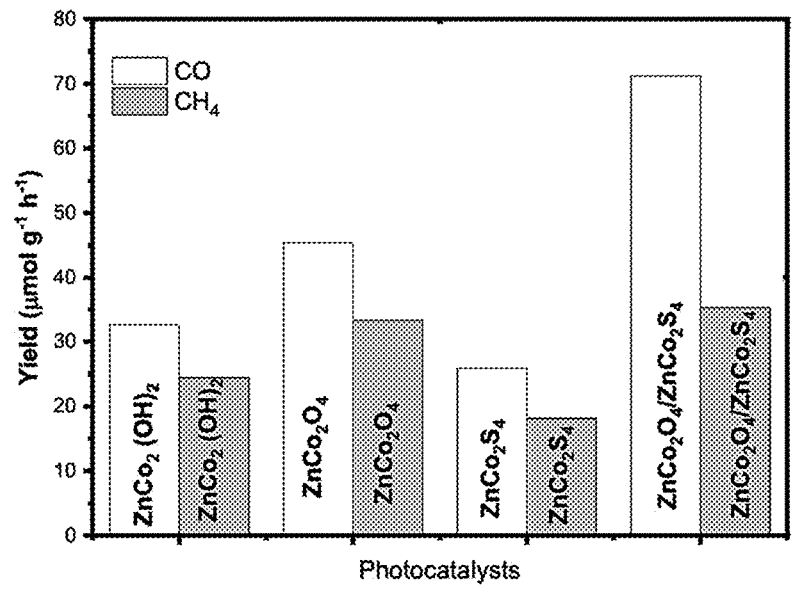
FIG. 9 shows the photocatalytic $CO_2$ reduction with $H_2O$ over various photocatalysts for the production of CO and $CH_4$ under visible light irradiation, in accordance with the present invention.

Initially, blank tests are conducted using all the photocatalysts in the process of reducing $CO_2$ with water and methanol. During these blank experiments, which involves the absence of light, $CO_2$, and photocatalyst, no additional products are detected in the gas phase. These findings reinforce the purity of the photocatalysts and affirm that the generation of products only occurs when $CO_2$ is actively reduced in the presence of light and photocatalyst. The absence of products in the blank experiments eliminates the possibility of contamination or interference, underscoring the reliability of the observed outcomes and confirming that the observed reactions are indeed driven by the photocatalysts. FIG. 9 illustrates the photocatalytic process of reducing $CO_2$ with $H_2O$ to generate CO and $CH_4$ in a gas-phase photocatalytic system. In all the samples, both CO and $CH_4$ are produced, however, the production of CO is higher compared to $CH_4$. Using $ZnCo_2(OH)_4$, CO and $CH_4$ yields of 32.6 and 24.42 μmol g$^{-1}$ h$^{-1}$ are produced. Similarly, CO and $CH_4$ yields of 45.42 and 33.33 μmol g$^{-1}$ h$^{-1}$ are obtained under identical reaction conditions on using $ZnCo_2O_4$. The higher CO and $CH_4$ production over the $ZnCo_2O_4$ compared to the $ZnCo_2(OH)_4$ is obviously due to more production of charge carriers as evidenced by PL analysis. However, using $ZnCo_2S_4$, amount of CO and $CH_4$ is reduced with a lower yield rate of 25.91 and 18.14 $\mu mol g^{-1} h^{-1}$ compared to using $ZnCo_2O_4$ and $ZnCo_2(OH)_4$ samples. This shows that sulfur-based materials are not efficient for $CO_2$ reduction compared to their oxides. This can be explained based on different characteristics and reaction pathways. The highest photoactivity is obtained with $ZnCo_2O_4/ZnCo_2S_4$ composite with their equal ratios, enabling to produce CO and $CH_4$ production rates of 71.21 and 35.27 $\mu mol\ g^{-1}\ h^{-1}$. This provides information about the importance of 1D/1D binary composite of two different materials and their influence on the oxidation and reduction reactions during the photocatalysis process.

Figure 10A:
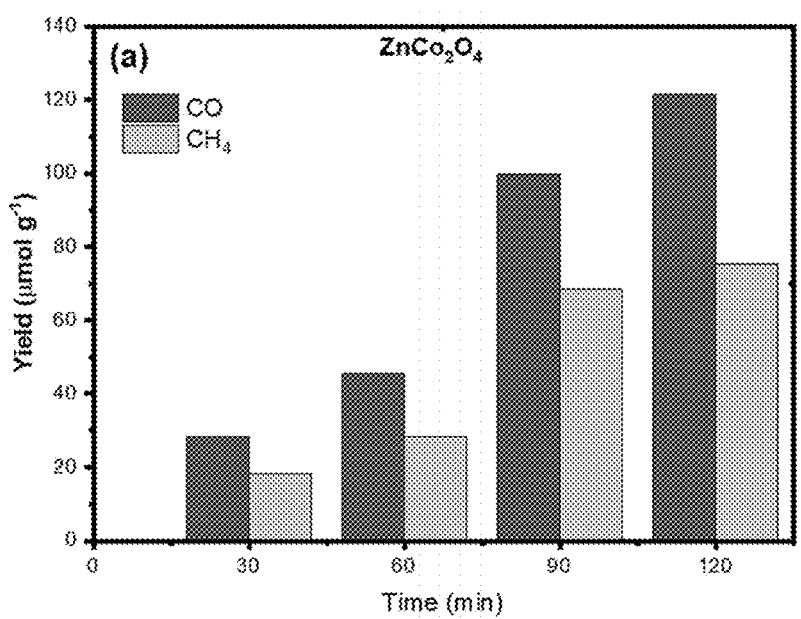
FIG. 10A shows the production of CO and $CH_4$ over $ZnCo_2O_4$ in photocatalytic $CO_2$ reduction with $H_2O$, in accordance with the present invention.
Figure 10B:
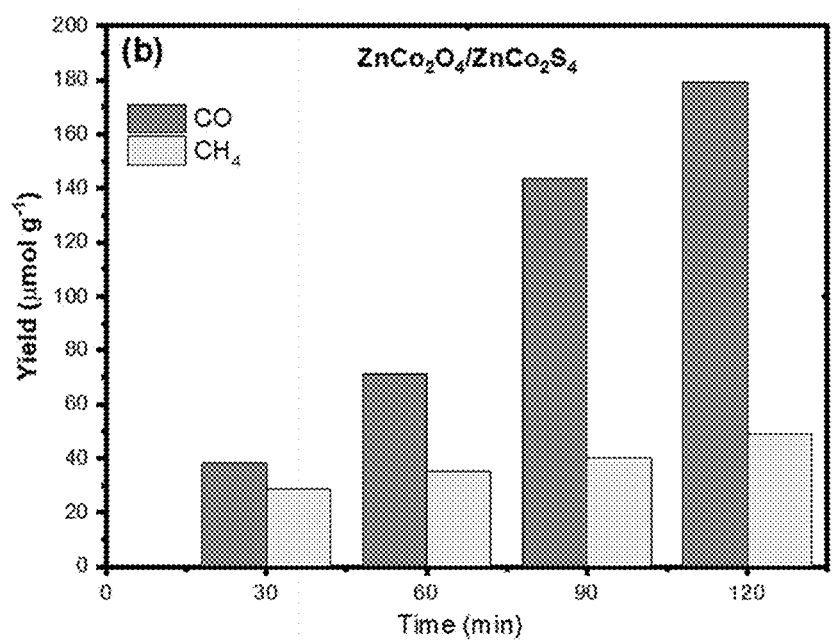
FIG. 10B shows the production of CO and $CH_4$ over 1D/1D $ZnCo_2O_4/ZnCo_2S_4$ composite in photocatalytic $CO_2$ reduction with $H_2O$, in accordance with the present invention.

The effect of irradiation time on the performance of $ZnCo_2O_4$ and $ZnCo_2O_4/ZnCo_2S_4$ 1D/1D composite is further investigated for the production of CO and $CH_4$ and the results are shown in FIG. 10A and FIG. 10B respectively. FIG. 10A shows the photoactivity of $ZnCo_2O_4$, in which continuous production of CO and $CH_4$ is obtained over the entire irradiation time. The CO and $CH_4$ yields of 121.34 and 75.33 $\mu mol\ g^{-1}$ are obtained after two hours of irradiation time under visible light irradiation. The production of CO is 1.61 folds higher than the $CH_4$ formation, which shows that $ZnCo_2O_4$ is more selective towards CO formation with a selectivity of 61.70%. This is possibly due to a more negative conduction band position and less production of electrons because only 2 electrons are required for CO formations, whereas $CH_4$ is produced with the involvement of 8 electrons. The performance of 1D $ZnCo_2O_4$ NRs is further investigated by combining with $ZnCo_2S_4$ to construct 1D/1D composites of $ZnCo_2O_4/ZnCo_2S_4$. FIG. 10B shows the production of CO and $CH_4$ over 1D/1D $ZnCo_2O_4/ZnCo_2S_4$ composites. Continuous production of CO and $CH_4$ can be observed over the entire irradiation time. The maximum CO and $CH_4$ production of 179.24 and 49.2 $\mu mol\ g^{-1}$ is obtained after 2 hours of irradiation time. Similar to other photocatalysts, selective CO production is obtained with selectivity of 78.46%. Comparatively, on using 1D/1D $ZnCo_2O_4/ZnCo_2S_4$ composites, the production of CO is 1.48 folds higher than it is produced by using only 1D $ZnCo_2O_4$ NRs. The increase in photocatalytic activity is due to efficient visible light utilization and proficient charge carrier separation.

Benefits of the proposed approach for the synthesis of one dimensional visible light active (photoactive) zinc cobalt oxides/sulfides nanorods ($ZnCo_2O_4$ and $ZnCo_2S_4$) in accordance with the present invention include a low-cost but highly efficient photocatalyst to convert solar energy to convert $CO_2$ into green fuels such as CO and $CH_4$ and for water splitting process to produce hydrogen. Semiconductor-based photocatalytic systems exhibit enhanced efficiency in harnessing solar energy, resulting in optimal yields of desired products. Enhancing the efficiency of semiconductors' light absorption, charge separation, and catalytic activity improves the overall process efficiency of photocatalysis for efficient $H_2$ production and $CO_2$ reduction harnessing the sunlight and contributing to environmental sustainability, with a net-zero carbon footprint. The bimetallic oxide/sulphide nanocomposites synthesized herein can meet the growing demand for photocatalysts that are both efficient and stable, particularly under visible light conditions. Besides photocatalytic applications, $ZnCo_2O_4$ and $ZnCo_2S_4$ compounds can be used in widespread applications in various other fields of energy storage, catalysis, and sensing such as in electrocatalysis, supercapacitors, batteries etc. The electrical conductivity properties of $ZnCo_2O_4$ make them potentially useful in various electrochemical applications, such as fuel cells, sensors, and batteries and their catalytic activity, particularly in oxygen reduction reactions (ORR) and oxygen evolution reactions (OER), make them crucial for energy conversion devices like fuel cells and water electrolyzers. $ZnCo_2O_4$ are thermally stable and can be employed in high-temperature applications. $ZnCo_2S_4$ is a semiconductor material which makes it useful in applications such as photocatalysis, solar cells, and sensors. It exhibits catalytic properties in hydrogen evolution reactions (HER) and other electrochemical processes. $ZnCo_2S_4$ possesses interesting optical properties, including absorption and emission characteristics, making it potentially useful in optoelectronic devices. Zinc cobalt oxide/sulfide nanorods are of significant market interest for solar energy utilization and storage, batteries, catalysts, $CO_2$ capture and utilization, $H_2$ production and water treatment.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A photocatalyst composition for producing hydrogen ($H_2$) by photocatalytic water splitting and for reducing $CO_2$ into useful chemicals comprising:
   one-dimensional photoactive zinc cobalt oxide nanorods (1D $ZnCo_2O_4$ NRs) of uniform size and shape;
   one-dimensional photoactive zinc cobalt sulfide nanorods (1D $ZnCo_2S_4$ NRs) of uniform size and shape; and
   1D/1D $ZnCo_2O_4/ZnCo_2S_4$ heterojunction nanocomposites exhibiting good interface interactions.

2. The photocatalyst composition of claim 1, wherein raw materials for producing the 1D $ZnCo_2O_4$ NRs by hydrothermal synthesis comprise 0.2 g of zinc acetate ($ZnC_4H_6O_4$), 0.32 g of cobalt nitrate ($Co(NO_3)_2 \cdot 6H_2O$), 0.60 g oxalic acid, urea of double the amount than oxalic acid, 20 mL ethanol and 20 mL DI (deionized) water.

3. The photocatalyst composition of claim 1, wherein 0.05 to 0.2 g of $ZnCo_2O_4$, 0.2 to 2 g of thioacetamide and 40 mL DI water act as raw materials for producing the 1D $ZnCo_2S_4$ NRs by replacing oxygen with sulfur via hybrid hydrothermal synthesis.

4. The photocatalyst composition of claim 1, wherein raw materials for producing 1D/1D heterojunction $ZnCo_2O_4/ZnCo_2S_4$ composites in a self-assembly approach comprise $ZnCo_2O_4$ and $ZnCo_2S_4$ of equal amounts homogenously dispersed in methanol and oven-dried at 100° C. for 24 hours.

5. The photocatalyst composition of claim 1, wherein the 1D $ZnCo_2O_4$ NRs and the 1D $ZnCo_2S_4$ NRs have a spinel crystal structure with zinc, cobalt and respective oxygen or sulfur ions arranged in a lattice and have stability over multiple cycles of photocatalytic reactions.

6. The photocatalyst composition of claim 5, wherein the 1D/1D $ZnCo_2O_4/ZnCo_2S_4$ heterojunction composites have higher charge separation efficiency, photocatalytic efficiency and stability over multiple cycles compared to single constituent materials $ZnCo_2O_4$ and $ZnCo_2S_4$.

7. The photocatalyst composition of claim 1, wherein the 1D $ZnCo_2S_4$ NRs, due to the presence of sulfur, are more suitable for hydrogen production than the 1D $ZnCo_2O_4$ NRs, whereas the 1D $ZnCo_2O_4$ NRs, due to oxides groups and surface defects, are more suitable for $CO_2$ reduction than the 1D $ZnCo_2S_4$ NRs.

8. The photocatalyst composition of claim 7, wherein the 1D/1D $ZnCo_2O_4/ZnCo_2S_4$ heterojunction composites produce the highest $H_2$ production of 290.2 ppm and the highest CO production of 179.24 molg$^{-1}$ than the 1D $ZnCo_2O_4$ and the 1D $ZnCo_2S_4$.

9. A method for synthesizing a photocatalyst composition comprising photoactive zinc and cobalt based oxides and sulfides nanorods of one-dimensional structure, comprising:
synthesizing zinc cobalt oxide nanorods (1D $ZnCo_2O_4$ NRs) of uniform size and shape using a facile hydrothermal method with specific amounts of raw materials;
synthesizing zinc cobalt sulfide nanorods (1D $ZnCo_2S_4$ NRs) of uniform size and shape using a hybrid hydrothermal method with specific amounts of raw materials; and
fabricating further 1D/1D $ZnCo_2O_4/ZnCo_2S_4$ heterojunction composites using a self-assembly approach,
wherein the photocatalyst composition uses solar energy to produce hydrogen ($H_2$) by photocatalytic water splitting and to convert $CO_2$ into useful chemicals by photocatalytic $CO_2$ reduction.

10. The method of claim 9, wherein the hydrothermal method for synthesizing the 1D $ZnCo_2O_4$ NRs comprise dissolving 0.2 g of zinc acetate ($ZnC_4H_6O_4$), 0.32 g of cobalt nitrate ($Co(NO_3)_2 \cdot 6H_2O$), 0.60 g of oxalic acid and urea in a double amount than oxalic acid in 20 mL of DI water and 20 mL ethanol; heating the solution at 140° C. for 12 hours; washing resultant 1D $ZnCo_2(OH)_2$ nanorods (NRs) with water or ethanol followed by drying at 100° C. for 24 hours; and heating the 1D $ZnCo_2(OH)_2$ NRs at 350° C. for 2 hours.

11. The method of claim 9, wherein the hybrid hydrothermal method for synthesizing the 1D $ZnCo_2S_4$ NRs comprise mixing 0.05 to 0.2 g of $ZnCo_2O_4$ and 0.2 to 2 g of thioacetamide in 40 mL DI water; heating the suspension at 140° C. for 12 hours; washing resultant product with DI water; and drying it at 100° C. for 24 hours.

12. The method of claim 9, wherein the self-assembly approach for synthesizing the 1D/1D $ZnCo_2O_4/ZnCo_2S_4$ heterojunction composites comprise homogeneously dispersing equal amounts of $ZnCo_2O_4$ and $ZnCo_2S_4$ in methanol by stirring and ultrasonication; and oven-drying final product at 100° C. for 24 hours.

13. The method of claim 9, wherein the 1D $ZnCo_2O_4$ NRs and the 1D $ZnCo_2S_4$ NRs have a spinel crystal structure with zinc, cobalt and respective oxygen or sulfur ions arranged in a lattice and have stability over multiple cycles of photocatalytic reactions.

14. The method of claim 13, wherein the 1D/1D $ZnCo_2O_4/ZnCo_2S_4$ heterojunction composites have higher charge separation efficiency, photocatalytic efficiency and stability over multiple cycles compared to single constituent materials $ZnCo_2O_4$ and $ZnCo_2S_4$.

15. The method of claim 9, wherein the photocatalytic water splitting for producing $H_2$ comprises injecting the photocatalyst into a slurry phase photoreactor system integrated with a light source; and analyzing using a micro-Gas Chromatography (GC) fusion.

16. The method of claim 9, wherein the photocatalytic $CO_2$ reduction for converting $CO_2$ into CO and $CH_4$ comprises exposing the photocatalyst and reactants to a light source; maintaining a constant flow rate of high-purity $CO_2$ gas using mass flow controllers; and analyzing using a micro-GC (fusion).

17. The method of claim 9, wherein the 1D $ZnCo_2S_4$ NRs are more suitable for hydrogen production than the 1D $ZnCo_2O_4$ NRs due to the presence of sulfur, and the 1D $ZnCo_2O_4$ NRs are more suitable than the 1D $ZnCo_2S_4$ NRs for $CO_2$ reduction due to oxides groups and surface defects.

18. The method of claim 17, wherein the 1D/1D $ZnCo_2O_4/ZnCo_2S_4$ heterojunction composites produce the highest $H_2$ production of 290.2 ppm and the highest CO production of 179.24 molg$^{-1}$ than the 1D $ZnCo_2O_4$ and the 1D $ZnCo_2S_4$.

\* \* \* \* \*